United States Patent [19]
Welgas

[11] 3,732,906
[45] May 15, 1973

[54] TRESTLE TEMPLATE FOR POWER SAWS

[76] Inventor: John Welgas, 5819 N. 6th St., Phila., Pa. 19120

[22] Filed: Feb. 19, 1971

[21] Appl. No.: 116,812

[52] U.S. Cl ........................................144/133 R
[51] Int. Cl .........................B27b 5/22, B27b 27/04
[58] Field of Search..................143/51 R, 51 A, 52 R, 143/52 A, 168 R, 170, 174 R; 144/133 R, 136 R, 125, 145 R, 145 A

[56] References Cited

UNITED STATES PATENTS

| 2,894,543 | 7/1959 | Ivy, Jr.................................143/170 |
| 1,831,124 | 11/1931 | Koster..............................143/170 X |
| 323,229 | 7/1885 | Strobridge et al.....................143/170 |
| 172,414 | 1/1876 | French..........................144/136 R X |
| 1,084,460 | 1/1914 | Marstall............................144/136 R |
| 1,823,272 | 9/1931 | Johnson........................144/133 R X |

*Primary Examiner*—Andrew R. Juhasz
*Assistant Examiner*—James F. Coan
*Attorney*—Karl L. Spivak

[57] ABSTRACT

A saw template for use in fabricating trestles including a first, angularly inclined work holding surface and a second work holding surface disposed at right angles to the first surface, the first and second surfaces positioning a length of wood which serves as the trestle head in precise angular relationship to a cutting blade to permit the blade to take identical, repeated, angular cuts to receive the trestle legs therein in exact angular relationship.

1 Claim, 11 Drawing Figures

PATENTED MAY 15 1973
3,732,906
SHEET 1 OF 2
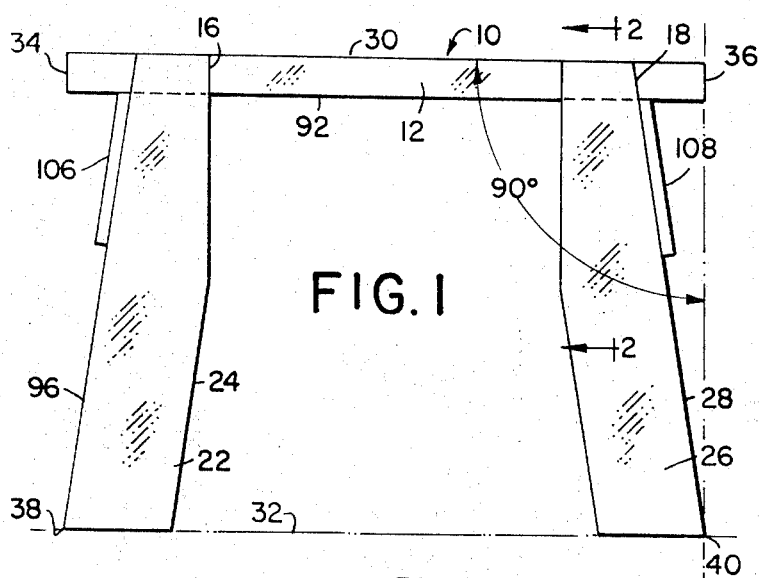
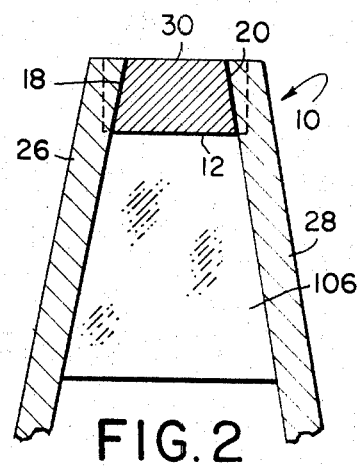
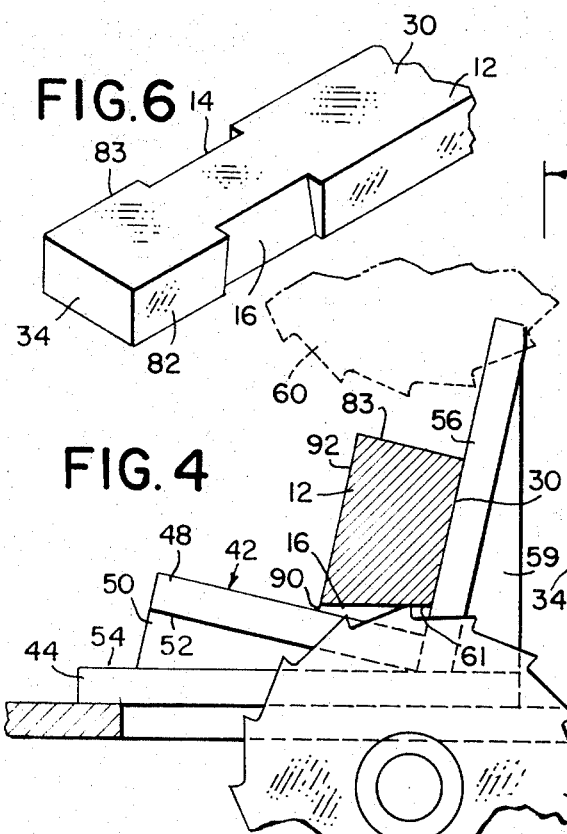
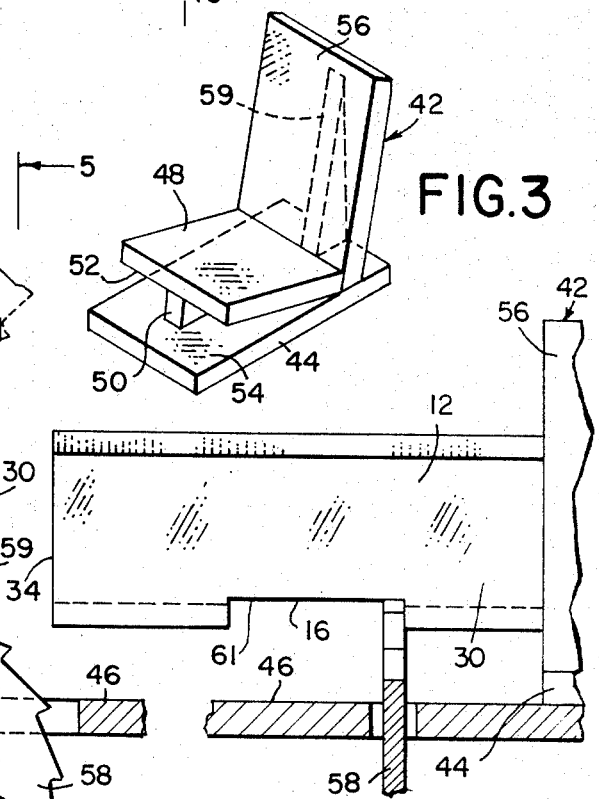
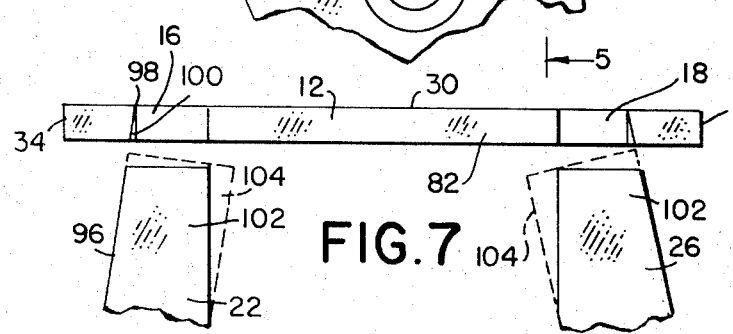
INVENTOR.
JOHN WELGAS
BY Karl L. Spivak
ATTORNEY.

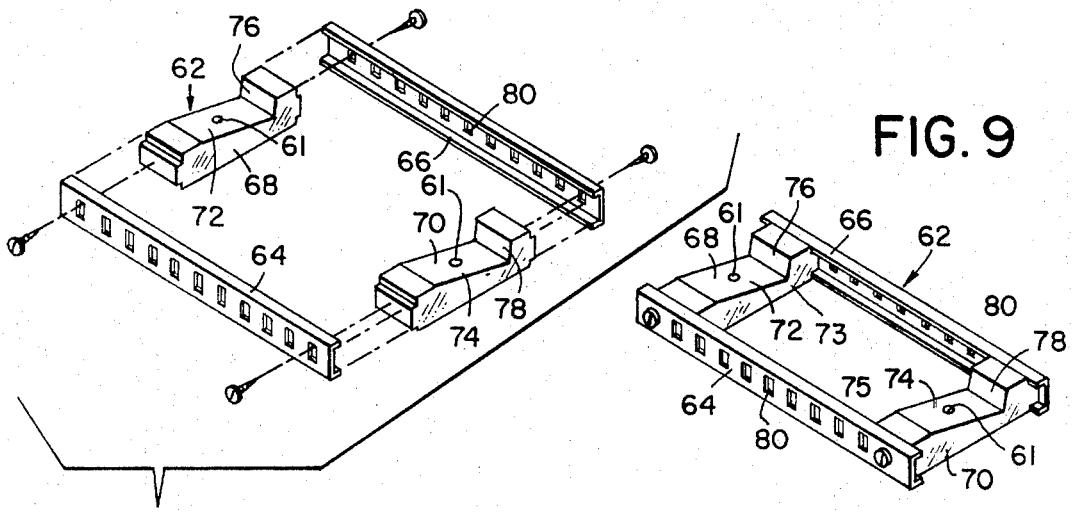
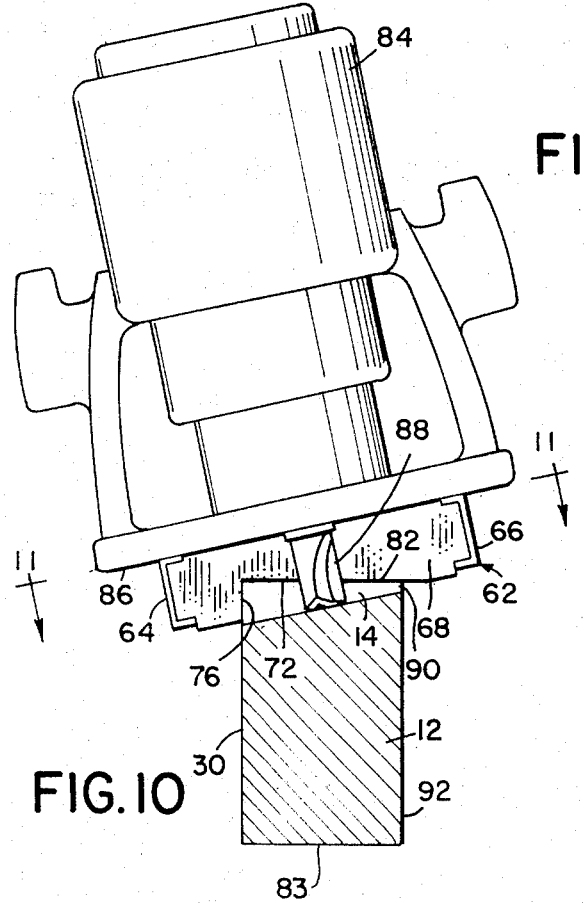
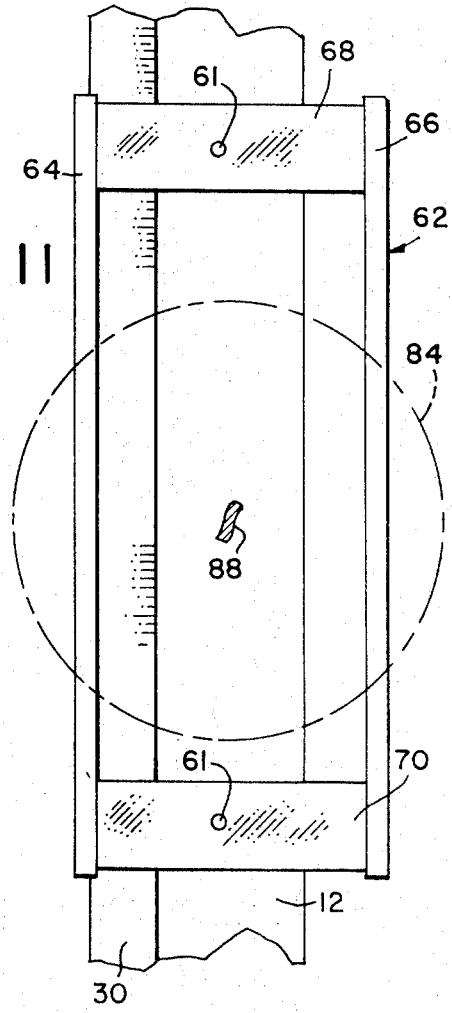

TRESTLE TEMPLATE FOR POWER SAWS

BACKGROUND OF THE INVENTION

The present invention relates generally to the art of carpentry tools and more particularly, is directed to a novel saw template for cutting angularly inclined notches in one side of a length of wood.

On all construction jobs, it is the common practice for the carpenters to fabricate trestles (saw horses) for their own use in connection with the work. Most carpenters are quite exacting in the type of trestle they desire to use, and accordingly, take considerable time and effort to painstakingly lay out, notch and fabricate trestles in accordance with their own specifications. This practice, of course, results in many different designs and shapes and so, trestles fabricated by one carpenter are not the same as or interchangeable with trestles fabricated by another carpenter.

Most carpenters attempt to fabricate trestles having a floor to head height of approximately 26 inches to provide a working surface at a comfortable height. Other important considerations in addition to height enter into the fabrication of a properly designed trestle. It is the usual practice to position the legs to incline laterally from the point of connection to terminate in a vertical plane aligned with the end of the head. In this manner, a compact design without extending members which may be likely to trip workmen on the job can be fabricated. Additionally the legs angularly incline transversely of the head in order to provide a sturdy, extremely stable working surface. The spread of the legs where they contact the floor is also of importance, as it is desirable to carpenters to carry their tools, including the trestles, between the studs of a building under construction. Said studs are normally positioned sixteen inches on center. Therefore, the legs of the trestle should angularly incline outwardly from the head at an angular relationship designed to permit the bottom of the legs to readily fit within the studding to permit a carpenter to go about his duties with the least amount of interference.

It will be appreciated that trestles are usually fabricated on the job on an individual basis by skilled carpenters to meet their own requirements. Because of the time consumed in designing, laying out and actually fabricating prior art trestles, these activities have tended to become quite costly to the contractor in view of the relatively high wages now paid to skilled carpenters in the building construction industry.

SUMMARY OF THE INVENTION

The present invention relates generally to the art of fabricating trestles, more particularly is directed to a saw template suitable for use with power tools normally found on the job site to quickly and accurately prepare trestles for use in the work.

The present invention includes a saw template which incorporates an angularly inclined first surface to receive one face of a rectangular length of wood and a second surface which angularly disposes from the first surface at an angle of ninety degrees to contact a second face of the work piece. The first and second surfaces of the template cooperate to position the length of wood in precise angular relationship to a cutting tool such as a bench saw or a hand router. The cutting tool cooperates with the template to cut angularly inclined notches in the length of wood for receipt of a plurality of legs which angularly depend from the length of wood to form a stable, compact and sturdy working surface.

The templates as set forth in the present disclosure precisely angularly position a length of wood with respect to a cutting blade to enable identical notches to be cut in one face of the wood in a minimum time requirement. In this manner, a carpenter's trestle may be fabricated on the job site with minimum skilled labor requirements. Additionally, the templates of the present invention permit identical notches to be cut at all times so that duplicate trestles can be fabricated at any time when required. Accordingly, a trestle assembled at the beginning of a job will be identical with a trestle constructed toward the middle or end of the job, so that identical working tools can be provided for the carpenter at all times during the course of the job.

It is therefore an object of the present invention to provide an improved saw template of the type set forth.

It is another object of the present invention to provide a novel saw template including first and second working surfaces which angularly incline to angularly position a length of wood with respect to a cutting surface.

It is another object of the present invention to provide an improved saw template including a first angularly inclined working surface and a second working surface intersecting the first surface at ninety degrees to precisely position a length of wood for cutting purposes.

It is another object of the present invention to provide a novel saw template including a base for positioning a length of wood upon the table of a rotary table saw or radial arm saw and including first and second angularly inclined surfaces to precisely angularly position one face of the wood with respect to the cutting blade.

It is another object of the present invention to provide a novel saw template having inclined first and second surfaces adapted to angularly position a length of wood on the job site to cut precise angular notches in the length of wood using a power hand tool, such as a router.

It is another object of this invention to provide a novel saw template that is inexpensive in manufacture, rugged in construction and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a side elevational view of a carpenter's trestle fabricated by utilizing saw templates in accordance with the present invention.

FIG. 2 is a cross sectional view taken along Line 2—2 of FIG. 1, looking in the direction of the arrows.

FIG. 3 is a perspective view of a saw template suitable for use with a table saw or a radial arm saw.

FIG. 4 is a side elevational view showing the template of FIG. 3 in use in conjunction with a table saw. A radial arm saw is indicated in phantom lines.

FIG. 5 is a cross sectional view taken along Line 5—5 of FIG. 4, looking in the direction of the arrows.

FIG. 6 is a perspective view of one end of a trestle head prior to complete fabrication and after the notches have been cut by utilizing saw templates in accordance with the present invention.

FIG. 7 is a partial, side elevational view showing the fabrication of the legs prior to trestle assembly.

FIG. 8 is an exploded perspective view of a modified type of saw template.

FIG. 9 is an assembled, perspective view of the modified saw template of FIG. 8.

FIG. 10 is an end elevational view showing the saw template of FIGS. 8 and 9 in use in connection with a power router.

FIG. 11 is a cross sectional view taken along Line 11—11 of FIG. 10, looking in the direction of the arrows.

DESCRIPTION OF THE PREFERRED EMBODIMENT OF THE INVENTION

Although specific terms are used in the following description for the sake of clarity, these terms are intended to refer only to the particular structure of my invention selected for illustration in the drawings and are not intended to define or limit the scope of the invention.

Referring now to the drawings, I show in FIGS. 1, 2 and 7 a carpenter's trestle 10, comprising an elongate head 12 which is generally fabricated of 2 by 3 or 2 by 4 lumber. The head is notched near each transverse end 34, 36 to provide a plurality of angularly inclined, leg receiving recesses 14, 16, 18, and 20. Each recess angularly inclines precisely one quarter inch per inch to receive the trestle legs 22, 24, 26, 28, and to position the legs in identical angular relationship to the head 12. It is desirable to transversely angularly incline the respective pairs of legs 22, 24 and 26, 28 outwardly for stability purposes. The widest distance between the legs 22, 24 and 26, 28 at the respective bottoms thereof is preferably restricted to a dimension suitable to fit within the usual 2 by 4 studs which are normally erected 16 inches on center when framing wall construction. Keeping in mind that a comfortable working height is twenty-six inches from the floor 32 to the top of the head 30, an angular inclination of the respective recesses 14, 16, 18, 20 of one quarter inch per inch has been found to be most satisfactory. In addition to transversely outwardly angularly inclining the trestle legs, I preferably laterally incline the legs from the respective recesses 14, 16 and 18, 20 toward the respective lateral ends 34, 36 of the head 12, both for the purposes of stability and to present a compact design. Preferably, the respective bottom lateral corners 38, 40 of the trestle legs 22, 24 and 26, 28 align with respective vertical planes drawn through the lateral ends 34, 36 of the trestle head 12.

In order to precisely and quickly angularly cut the respective recesses 14, 16, 18 and 20 in the trestle head 12, I have provided saw template 42 as illustrated in FIGS. 3 and 4. The template 42 includes a flat base plate 44 for positioning upon the table 46 of a conventional bench saw or radial arm saw. A first inclined work holding surface 48 angularly rises from the base plate 44 at an angular relationship of precisely one quarter inch per inch. An angular fillet 50 positions between the bottom 52 of the first work holding surface 48 and the top 54 of the base plate 44 to support the first work holding surface 48 in its said angular position. An angularly inclined back plate 56 positions at precisely ninety degrees from the work holding surface 48 and fixedly connects to the base plate 44 in any well known, secure manner to provide a second work holding surface. An upright fillet 59 secures the back plate 56 in correct angular relationship to both the first work holding surface 48 and the base plate 44. Preferably all of the members comprising the saw template 42 are fabricated of one quarter inch steel plate for purposes of strength and ability to resist deformation. The members are welded or otherwise secured together in well known manner to prevent any angular displacement of the functioning parts.

In operation, two similar saw templates 42, position upon the table 46 of a bench saw or radial arm saw and support the trestle head 12 therebetween in angular inclination to the plane of the table surface. The spaced saw templates 42 carry the head 12 therebetween in angular relationship to the table top 46 for contact by the bench saw blade 58. Preferably, the blade 58 is of the dado type to minimize the number of passes of the blade with respect to the head 12. As indicated in phantom lines in FIG. 4, a pair of spaced saw templates 42 can similarly be used in connection with an overhead radial arm saw blade 60 which also is preferably of the dado blade type. In the first instance, the recesses 14, 16, 18, 20 are cut from below by the blade 58. In the second instance, the recesses are cut from above by utilizing the radial arm blade 60. In either event, the recesses precisely incline at the desired angle on each side of the head 12 for affixing the legs 22, 24 and 26, 28 as herein set forth. It will be noted that the angular inclination of the head 12, as securely held between the spaced saw templates 42, results in a precise angular cut recess by utilizing conventional bench saw or radial arm saw equipment. In either case the angular cut recesses result from reciprocal horizontal movement of the head 12 and the blades 58 or 60. Thus, as best seen in FIG. 4, the inner wall 61 of a recess, for example, recess 16, is cut exactly parallel to the top of the saw table 46. The four recesses 14, 16, 18, 20 may be readily cut by positioning the head 12 in a pair of spaced saw templates 42 and by moving the work as necessary with respect to the saw blades 58 or 60 to position the head in proper location for cutting the various recesses.

Referring now to FIGS. 8 and 9, I show a modified type of saw template 62 comprising generally a pair of spaced power tool contacting base supports 64, 66, which preferably are formed to a channel shaped cross sectional configuration. A pair of cross braces 68, 70 transversely connect to the respective ends of the base supports 64, 66 and are machined or otherwise formed to provide a pair of angularly inclined, first work holding surfaces 72, 74 which angularly depend from a plane drawn through the base supports 64, 66 at precisely one-quarter inch per inch. The first inclined work holding surfaces 72, 74 terminate transversely at one end thereof in the angularly inclined back plates 76, 78. The back plates intersect at precisely ninety degrees with the inclined working holding surfaces 72, 74 to provide the second work holding surfaces. The base supports 64, 66 endwardly connect to the transverse ends of the respective cross braces 68, 70 in well-known manner such as by bolting to form a sturdy, generally rectangular, adjustable router template. Each base support 64, 66 is drilled or otherwise machined to provide a plurality of longitudinally spaced openings 80 which receive the base support affixing bolts 81 therein. Accordingly, the spacing between the cross braces 68, 70 can be readily varied by positioning the cross braces on the base supports 64, 66 in the desired spaced position and then securing in the desired position by tightening the bolts 81 through the aligned openings 80. The members are preferably fabricated of steel to provide the necessary rigidity and strength for continuous field application without deformation or other damage.

Referring now to FIGS. 10 and 11, the modified template 62 positions over one side 82 or 83 of the trestle head 12 in the desired location to precisely angularly cut a recess 14, 16, 18 or 20. One side 82 or 83 of the head 12 feeds onto the first inclined work holding surfaces 72, 74 to angularly position the saw template 62 with respect to the axis of the trestle head 12. The top 30 of the head seats firmly against the respective back plates 76, 78 which form the second work holding surfaces to securely position the template with respect to the head 12. A usual router 84 having a base table 86 applies directly over the template 62 in a manner to rest the router table 86 directly upon the upper flanges of the channels of the spaced base supports 64, 66. As seen in FIG. 10, the angular inclination of the first work holding surfaces 72, 74 when applied against the side 82 of the trestle head 12, angularly inclines the entire saw template 62. The router 84 rests directly upon the template 62 and so also inclines to the same angular inclination. The router blade 88 then activates in the usual manner to cut the respective recesses 14, 16, 18, 20 by positioning the template 62 in the proper location on the head 12 to make the desired recess cuts. It will be observed that the blade 88 cuts parallel to the plane of the table 86 and similarly cuts the recess 14, 16, 18 or 20 to the required depth in a cut that is also parallel with the base table 86. Thus, the first inclined work holding surfaces 72, 74 and second work holding surfaces 76, 78 position the head to precisely angularly cut the recesses to the desired angular inclination.

In order to use the template 62 to fabricate a carpenter's trestle, the head 12 should first be cut to the desired length, for instance 36 inches. Then measure 4 inches in from each end 34, 36 and place a mark to indicate the outer position of the legs 22, 24, 26, 28. Next, space the cross braces 68, 70 apart the desired distance to accommodate the width of lumber being employed for the legs. In the case of legs of six inch nominal width, the cross braces should be spaced four inches apart. As hereinbefore mentioned, the cross braces may be readily positioned in any spaced relation upon the base supports 64, 66 by inserting the bolts 81 through desired support openings 80 and then tightening in place. The template 62 is then positioned upon the head 12 with the inner edge 73 or 75 of a cross brace 72, 74 aligned with one said mark and with the remainder of the template extending in the direction of the other said mark. The template removably secures to the work by nailing through the cross brace openings 61 directly into the head 12. The first inclined work holding surfaces 72, 74 contact a side 82 or 83 of the head 12 and the second work holding surfaces 76, 78 firmly seat against the top 30 to angularly position the base supports 64, 66 with respect to the vertical axis of the head 12. See FIG. 10. The router 84 is then activated so that the blade 88 removes all of the angularly configured area between the cross braces 68, 70 in turn from each side 82, 83.

With the template 62 firmly affixed to the head 12 at the side 82 or 83 thereof, a router 84 positions with the base table 86 resting directly upon the upper flanges of the template base supports 64, 66. The blade 88 is lowered to cut a recess 14, 16, 18 or 20 having a notch 90 in the bottom surface 92 of the head 12 that is one-eighth inch below the side 82 or 83 of the head as arranged in FIG. 10 for positively securing the legs during the trestle assembly process. The blade 88 is activated to cut out the material inside of the template guide to form a perfectly inclined, properly positioned recess 14. The process is then repeated to properly prepare the remaining recesses 16, 18 and 20.

In cutting the recesses 14, 16, 18, 20 utilizing the saw template 42, a first mark is applied to the head at a distance of four inches from each end, and then a second mark is applied to correspond to the width of the leg to be used in the manner hereinbefore set forth. Two templates 42 are placed upon the table 46 of a bench or radial arm saw in spaced relation and the head 12 is positioned upon the spaced templates 42 with one leg face 82 or 83 down and with the top 30 resting firmly against the back plates 56. See FIG. 4. The saw blade 58 is then raised to cut a notch 90 of one-eighth inch on the bottom surface 92 of the head 12. By pushing the head across the blade 58, the material between the two marks is then readily removed to form a perfectly inclined angular recess 14. The remaining recesses 16, 18, and 20 are similarly cut in the same manner by properly positioning a side 82, 83 with respect to the blade 58. As indicated in FIG. 4, the same method may be employed utilizing radial arm saw blade 60. In this instance, the head 12 is stationary upon the table 46 and the blade 60 is brought across the work until all excess material is removed to form the respective recesses 14, 16, 18, 20. It should be noted that a dado blade is preferable for use as the blades 58, 60 but that regular saw blades may also be utilized by taking sufficient additional cuts as may be required.

To complete a carpenter's trestle 10 after the respective recesses 14, 16, 18, 20 have been cut in the head 12 by utilizing either the saw templates 42 or the modified saw template 62, place the head 12 on a working surface (not shown) and mark off 26 inches downwardly at 90° from each end 34, 36. Place a trestle leg 22, 26 with its outer edge 90 aligned to position the bottom corner 38, 40 at the said 26 inch mark and the leg top 102 overlying the top 98 of the outer limit of a recess 14 to define a small triangular area 100 on the side 82 of the head 12. This triangular area can then be removed using a saw and chisel in the usual manner to thereby shape the recess to allow the bottom corner 38, 40 of the leg to align with a vertical plane drawn through the respective head ends 34, 36. The top 102 of the leg should then be positioned to overlie the previously shaped recess 16 and marked to square out the leg with the head so that the top of the head will position 26 inches above the floor. The excess material 104 can then be removed from the top of the leg by employing a hand saw in the usual manner. Using this leg for a pattern, the remaining three legs can be readily cut prior to assembly.

With the leg tops properly shaped but not cut to length, the respective tops 102 insert upwardly into the associated recesses 14, 16, 18, 20. The bottoms of the legs can be tapped to wedge each leg securely to the head within the respective recess. Nails driven through the leg tops 102 directly into the head material behind the respective recesses serve to secure the legs in precise desired angular relationship with respect to the head 12. After all of the legs have been nailed tight to the head 26 inches should be measured on the outside edge 96 of each leg in vertical alignment with the head end 34, 36 and marks placed thereon. A straight edge placed across the said marks on laterially positioned pairs of legs 22, 26 and 24, 28 define the leg bottoms which are then cut to form a sturdy trestle that will stand solidly on the floor.

To complete the trestle 10, pieces of plywood about 6 inches wide and three-eighths inch or one-half inch in thickness can be utilized for the gussets 106, 108. The plywood pieces should be held tight against the legs 22, 24, 26, 28 and the head to permit the angular relations to be readily marked for a pattern. The excess material can be cut off in the usual manner and the gussets nailed in place to form an extremely strong carpenter's trestle 10. In this manner, one pair of trestles or 10 trestles may be readily manufactured by hand with a minimum of effort and at a minimum time requirement. The trestles will always mate by following this technique. Should a trestle break during the course of a job, it is a simple matter to fabricate an exact duplicate. One year or 5 years later, by utilizing the template 42 or 62 and the technique herein described, a duplicate trestle can always be produced.

I claim:

1. In a saw template for cutting angular recesses in a work piece having a plurality of sides and suitable for use with a power tool having a table surface and a rotary saw blade, the combination of
   A. a base support having a top and a bottom, the said bottom resting in contact with the table surface of the power tool,
      1. said base support having unrestricted planar movement relative to the table surface,
   B. a first work holding surface associated with the base support and being angularly inclined therefrom, said first work holding surface having a top and a bottom,
      1. said first work holding surface holding the work piece in angular relation to the said base support,
      2. said first work holding surface extending in a direction normal to the vertical plane drawn through the rotary saw blade,
   C. a second work holding surface angularly intersecting the first work holding surface, said second work holding surface having a front and a rear,
      1. said second work holding surface intersecting the first work holding surface at an angle of 90°,
      2. said first and second work holding surfaces cooperating to position the work piece in angular relation to the table surface,
      3. said second work holding surface extending in a direction normal to the vertical plane drawn through the rotary saw blade;
   D. first wedge shaped fillet means interposed between the base support and the first work holding surface,
      1. said first wedge shaped fillet means contacting the top of the base support and the bottom of the first work holding surface; and
   E. second wedge shaped fillet means interposed between the base support and the second work holding surface,
      1. said second wedge shaped fillet means contacting the top of the base support and the rear of the second work holding surface.

* * * * *